`United States Patent` [19]

Brinegar

[11] 3,720,607

[45] March 13, 1973

[54] REVERSE OSMOSIS PROCESS EMPLOYING POLYBENZIMIDAZOLE MEMBRANES

[75] Inventor: Willard C. Brinegar, Charlotte, N.C.

[73] Assignee: Celanese Corporation, New York, N.Y.

[22] Filed: April 15, 1970

[21] Appl. No.: 28,940

[52] U.S. Cl................................210/23, 210/500
[51] Int. Cl. .............................................B01d 13/00
[58] Field of Search ......210/22, 23, 321, 500; 55/16, 55/158; 264/41, 49, 216; 204/180 P, 301; 260/2.5 R, 78.4; 106/122

[56] References Cited

UNITED STATES PATENTS

| | | |
|---|---|---|
| 3,174,949 | 3/1965 | Marvel et al...............260/78.4 R X |
| 3,524,753 | 8/1970 | Sharp..............................264/216 X |
| 3,433,772 | 3/1969 | Chenevey et al. ..............260/2.5 X |
| 3,331,772 | 7/1967 | Brounscombe et al..........210/500 X |
| 3,386,912 | 6/1968 | Lazane............................210/500 X |
| 3,412,184 | 11/1968 | Sharples et al. ................210/500 X |
| 3,483,282 | 12/1969 | Manjikian........................210/500 X |
| 3,497,072 | 2/1970 | Cannon.............................264/49 X |
| 3,520,804 | 7/1970 | Hoke...............................210/500 X |
| 3,520,960 | 7/1970 | Douglas...........................210/500 X |
| 3,526,588 | 9/1970 | Micheals et al. .....................210/23 |
| 3,556,992 | 1/1971 | Massucco........................210/500 X |
| 3,567,632 | 3/1971 | Richter et al....................210/500 X |
| 3,439,074 | 4/1969 | Sharples et al. ................210/500 X |
| 3,567,810 | 3/1971 | Baker..............................210/500 X |
| 3,556,305 | 1/1971 | Shorr................................264/49 X |
| 3,522,335 | 7/1970 | Rowley...........................210/500 X |
| 3,527,853 | 9/1970 | Rowley et al...................210/500 X |
| 3,497,072 | 2/1970 | Cannon...........................210/321 X |

*Primary Examiner*—Samih N. Zaharna
*Assistant Examiner*—Richard Barnes
*Attorney*—Thomas J. Morgan, Charles B. Barris and Kenneth E. Macklin

[57] ABSTRACT

A process for desalinization of water by reversed osmosis is disclosed particular utility in the separation of components of a solution. A solution of a polybenzimidazole polymer is deposited upon a support to form a wet film, an amount of solvent is evaporated from the wet film sufficient to allow the formation of a thin layer of higher density at the exposed surface of the film, and the resulting film is washed to remove residual solvent and thereby form a semipermeable polybenzimidazole membrane which membrane is then employed in the reverse osmosis process.

10 Claims, No Drawings

REVERSE OSMOSIS PROCESS EMPLOYING POLYBENZIMIDAZOLE MEMBRANES

BACKGROUND OF THE INVENTION

In recent years there has been increasing interest expressed in the development of microporous membranes of a semipermeable nature which are useful in separating the components of a solution. For instance, semipermeable membranes have been looked to as a possible means to demineralize or purify otherwise unusable water and to thereby alleviate the increasing demands for potable water necessitated by the rapid growth of the population and industry in many parts of the world. Separation techniques which employ such membranes include electrodialysis, reverse osmosis, ultrafiltration, etc.

Electrodialysis separations employ an electrolytic cell having alternating anionic and cationic membranes that collect desalted and concentrated solutions in adjacent compartments. Such a technique can be useful to purify liquids by removing ionizable impurities, to concentrate solutions of electrolytes, or to separate electrolytes from non-electrolytes.

As opposed to the charge dependent types of separations, reverse osmosis utilizes pressure to move materials which may be either ionic or non-ionic selectively through a membrane. Ultrafiltration, which is very similar, uses gravity or applied pressure to effect separation using membranes which act as submicronic sieves to retain large molecules and permit the passage of small, ionic, or non-ionic forms.

The desalination of salt or sea water through the use of semipermeable membranes is commonly characterized by the use of pressure in excess of osmotic pressure and is therefore termed reverse osmosis. The natural tendency for a solution of a higher concentration separated from a solution of lower concentration by a semipermeable membrane, is for the solvent on the side of lower concentration to migrate through the membrane to the solution of higher concentration thereby eventually equilibrating the concentrations of the two solutions. The degree of this natural tendency is termed osmotic pressure. The process may be reversed by applying a force to the side of higher concentration in excess of the osmotic pressure to force the solvent of the solution of higher concentration through the semipermeable membrane to the side of lower concentration thereby bringing about a separation. The natural tendency which is believed to be the result of a difference in free energy resulting from the concentration gradient, is observed to operate at a high termodynamic efficiency, and at ambient temperature.

Semipermeable membranes proposed in the past have been formed from a variety of materials, and are characterized by the ability to allow one component (e.g., ions or molecules) of a solution to pass through the same to the substantial exclusion of other components (e.g., other ions or molecules). Examples of substances heretofore recognized to possess this property include cellophane (i.e., regenerated cellulose), cellulose esters (e.g. cellulose acetate, cellulose butyrate, etc.), animal or protein membranes, polyelectrolyte complexes, ethyl cellulose, cross-linked polyacrylates, etc.

The semipermeable membranes of the prior art are of limited applicability in many separatory processes because of inherent disadvantages relating to their chemical stability, thermal stability, efficiency, length of life, and cost. Generally, the prior art membranes exhibit low thermal stability and therefore cannot be used successfully under conditions wherein the liquid undergoing treatment is at an elevated temperature. This may be a decided disadvantage in situations where the components to be separated only exist in solution at higher temperatures, or when it is economically advantageous to separate components of a solution at elevated temperatures rather than going through the expense of cooling it. Furthermore, some membranes exhibit a decided decrease in efficiency with increase in temperature or pressure thereby limiting their range of applicability. Solvent susceptibility may be another factor affecting the applicability of a particular porous membrane to a separation process. Additionally, semipermeable membranes may be inappropriate for a particular application due to low rejection values or low flux.

Representative cellulose acetate membranes, which may be utilized in desalination processes are disclosed in Loeb et al, U.S. Pat. No. 3,133,132, issued May 12, 1964. The Loeb et al patent also discloses a process for preparing semipermeable membranes involving the casting of a cellulose acetate solution containing a pore producing agent, i.e., an agent which produces a structure which allows an appreciable rate of passage of fresh water under suitable conditions. It has been found, however, that cellulose acetate membranes described therein must be utilized under relatively mild conditions and may not satisfactorily be utilized at elevated temperatures, i.e., in excess of 70° to 80°C. Upon continuous exposure to salt water such cellulose acetate membranes tend to undergo hydrolysis and become less effective for their intended purpose. Also, such membranes may be damaged by contact with a variety of solvents (e.g., phenol, acetone, methyl ethyl ketone, sodium hydroxide solutions, mineral acid solutions), or by bacteriological attack.

The applicability of a particular membrane to the separation of components from solutions appears to depend on both the physical nature of the semipermeable structure and the particular chemical structure of the membrane. It should be noted here that, in accordance with common usage, the terms microporous and semipermeable or permeable will be used interchangeably to denote the character or quality of the membrane which is necessary to render the membrane suitable for the use herein intended. More specifically, the membranes described herein are characterized by the fact they they allow one component of a solution to pass through them while they prevent the passage of another component.

It is an object of the invention to provide a process for separating the components of an aqueous salt solution utilizing semipermeable polybenzimidazole membranes.

This and other objects as well as the scope, nature and utilization of this invention will be apparent from the following detailed description.

SUMMARY OF THE INVENTION

It has been found that a process for producing a semipermeable membrane comprises:

a. providing a solution of a polybenzimidazole polymer in a solvent capable of dissolving said polymer,
b. depositing a film of said solution upon a support,
c. evaporating an amount of solvent from said film sufficient to allow the formation of a thin solid layer on the exposed surface of said film having a density which is substantially greater than the remaining portion of said film on which said solid layer of increased density is formed, and
d. washing the resulting film with a non-solvent for said polymer to remove residual solvent thereby producing a semipermeable membrane.

The resulting polybenzimidazole semipermeable membranes may be utilized to separate components of a solution, e.g., salt from an aqueous salt solution by reverse osmosis.

DESCRIPTION OF PREFERRED EMBODIMENTS

The Starting Polymer

The polymeric material utilized to form the semipermeable membranes of the present invention is a linear polybenzimidazole. Typical polymers of this class and their preparation are more fully described in U.S. Pat. No. 2,895,948, U.S. Reissue Pat. No. RE 26,065, and in the Journal of Polymer Science, Vol. 50, pages 511–539 (1961) which are herein incorporated by reference. The polybenzimidazoles consist essentially of recurring units of the following Formulas I and II. Formula I is:

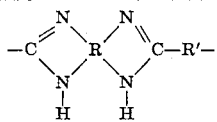

wherein R is a tetravalent aromatic nucleus, preferably symmetrically substituted, with the nitrogen atoms forming the benzimidazole rings being paired upon adjacent carbon atoms, i.e., ortho carbon atoms, of the aromatic nucleus, and R' is a member of the class consisting of (1) an aromatic ring, (2) an alkylene group (preferably those having four to eight carbon atoms), and (3) a heterocyclic ring from the class consisting of (a) pyridine, (b) pyrazine, (c) furan, (d) quinoline, (e) thiophene, and (f) pyran. Formula II is:

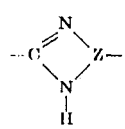

wherein Z is an aromatic nucleus having the nitrogen atoms forming the benzimidazole ring paired upon adjacent carbon atoms of the aromatic nucleus.

Preferably, aromatic polybenzimidazoles are selected, e.g., polymers consisting essentially of the recurring units of Formulas I AND II wherein R' is an aromatic ring or a heterocyclic ring.

As set forth in U.S. Reissue Pat. No. RE 26,065, the aromatic polybenzimidazoles having the recurring units of Formula II may be prepared by self-condensing a trifunctional aromatic compound containing only a single set of ortho disposed diamino substituents and an aromatic, preferably phenyl, carboxylate ester substituent. Exemplary of polymers of this type is poly-2,5(6)-benzimidazole prepared by the autocondensation of phenyl-3,4-diaminobenzoate.

As also set forth in the above-mentioned patent, the aromatic polybenzimidazoles having the recurring units of Formula I may be prepared by condensing an aromatic tetramine compound containing a pair of orthodiamino substituents on the aromatic nucleus with a dicarboxyl compound selected from the class consisting of (a) the diphenyl ester of an aromatic dicarboxylic acid, (b) the diphenyl ester of a heterocyclic dicarboxylic acid wherein the carboxyl groups are substituents upon carbon in a ring compound selected from the class consisting of pyridine, pyrazine, furan, quinoline, thiophene and pyran and (c) an anhydride of an aromatic dicarboxylic acid.

Examples of polybenzimidazoles which have the recurring structure of Formula I are as follows:

poly-2,2'(m-phenylene)5,5'-bibenzimidazole;
poly-2,2'-(pyridylene-3",5")-5,5'-bibenzimidazole;
poly-2,2'-(furylene-2",5")-5,5'-bibenzimidazole;
poly-2,2'-(naphthalene-1",6")-5,5'-bibenzimidazole;
poly-2,2'-(biphenylene-4",4'")-5,5'-bibenzimidazole;
poly-2,2'-amylene-5,5'-bibenzimidazole;
poly-2,2'-octamethylene-5,5'-bibenzimidazole;
poly2,6-(m-phenylene)-diimidazobenzene;
poly-2,2'-cyclohexeneyl-5,5'-bibenzimidazole;
poly-2,2'(m-phenylene)-5,5'-di(benzimidazole) ether;
poly-2,2'(m-phenylene)-5,5'-di(benzimidazole) sulfide;
poly-2,2'(m-phenylene)-5,5'-di(benzimidazole) sulfone;
poly-2,2'(m-phenylene)-5,5'-di(benzimidazole) methane;
poly-2',2"(m-phenylene)-5',5" di(benzimidazole) propane-2,2; and
poly-2',2"(m-phenylene)-5',5" di(benzimidazole) ethylene-1,2 where the double bonds of the ethylene groups are intact in the final polymer.

The preferred polybenzimidazole for use in the present process is one prepared from poly-2,2'-(m-phenylene)-5,5'-bibenzimidazole, the recurring unit of which is:

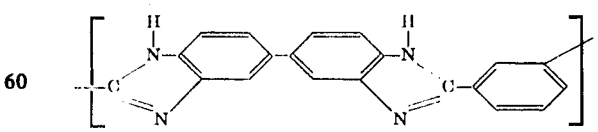

Any polymerization process known to those skilled in the art may be employed to prepare the polybenzimidazole which is utilized to form semipermeable membranes in accordance with the present invention. With respect to aromatic polybenzimidazoles, preferably, equimolar quantities of the monomeric tetraamine and dicarboxyl compound may be introduced into a first stage melt polymerization reaction zone and heated therein at a temperature above about 200°C., preferably at least 250°C., and more preferably from about 270° to 300°C. The reaction is conducted in a substantially oxygen-free atmosphere, i.e., below about 20 ppm oxygen and preferably below about 8 ppm oxygen, until a foamed prepolymer is formed. Usually, the first stage reaction is continued until a prepolymer is formed having an inherent viscosity, expressed as deciliters per gram, of at least 0.1, and preferably from about 0.13 to 0.3 (determined from a solution of 0.4 grams of the polymer in 100 ml. of 97 per cent $H_2SO_4$ at 25°C.).

After the conclusion of the first stage reaction, which normally takes at least 0.5 hours and preferably 1 to 3 hours, the foamed prepolymer is cooled and then powdered or pulverized in any convenient manner. The resulting prepolymer powder is then introduced into a second stage polymerization reaction zone wherein it is heated under substantially oxygen-free conditions, as described above, to yield a polybenzimidazole polymer product, desirably having an I.V., as measured above, of at least 0.4, e.g., 0.8 to 1.1 or more.

The temperature employed in the second stage is at least 250°C., preferably at least 325°C., and more preferably from about 350° to 425°C. The second stage reaction generally takes at least 0.5 hours, and preferably from about 1 to 4 hours or more.

The Polymer Solution

The solvents utilized to form the polybenzimidazole polymer solutions include those solvents which are commonly recognized as being capable of dissolving the particular polybenzimidazole polymer. For instance, the solvents may be selected from those commonly utilized in the formation of polybenzimidazole dry spinning solutions. Illustrative examples of suitable solvents include N,N-dimethyl acetamide, N,N-dimethyl formamide, dimethyl sulfoxide, and N-methyl-2-pyrrolidone. The particularly preferred solvent is N,N-dimethyl acetamide. Additional representative solvents include formic acid, acetic acid, and sulfuric acid.

The polymer solutions may be prepared, for example, by dissolving sufficient polybenzimidazole in the solvent to yield a final solution containing from about 5 to 30 per cent by weight of polymer based on the total weight of the solution, and preferably from about 10 to 20 per cent by weight.

The quantity of polybenzimidazole dissolved in the solvent should be such that the resulting solution has a viscosity of about 50 to 4000 poises at 30°C., and preferably about 400 to 600 poises.

One suitable means for dissolving the polymer in the solvent is by mixing the materials at a temperature above the normal boiling point of the solvent, for example, about 25° to 120°C. above such boiling point, and at a pressure of 2 to 15 atmospheres for a period of 1 to 5 hours. The resulting solutions then preferably are filtered to remove any undissolved polymer. A minor amount of lithium chloride optionally may be provided in the spinning solution in accordance with the teachings of commonly assigned U.S. Ser. No. 521,501, filed Jan. 16, 1966, of Anthony B. Conciatori and Charles L. Smart (now U.S. Pat. No. 3,502,606). The lithium chloride serves the function of preventing the polybenzimidazole polymer from phasing out of the solution upon standing for extended periods of time.

Semipermeable Membrane Formation

The solution of polybenzimidazole polymer is deposited upon a support to form a wet film of the same. The nature of the support is not critical and may be selected from a variety of materials including ceramic, glass, or metallic plates (e.g., stainless steel). The support is preferably provided with retaining sides, or raised edges, whereby the solution is confined to the surface thereof at the desired location until its consistency is such that retaining sides are no longer needed. Numerous techniques are available for the application of the solution to the support as will be apparent to those skilled in the art. For instance, the polybenzimidazole polymer solution may be simply poured upon a level support in a quantity sufficient for it to assume the desired uniform thickness. A blade optionally may be drawn over the surface of the wet film to aid the deposition of a wet film of uniform thickness. In a preferred embodiment of the invention, the solution is deposited by the utilization of a doctor blade caster.

The thickness of the wet film deposited upon the support is influenced by the desired thickness of the polybenzimidazole semipermeable membrane ultimately to be produced. Commonly the wet film is deposited upon the support in a substantially uniform thickness of about 1 to 30 mils and preferably 2 to 10 mils. In a particularly preferred embodiment of the invention, the wet film is deposited in a thickness of about 4 to 8 mils.

A quantity of solvent is next evaporated from the exposed surface of the wet film to allow the formation of a relatively thin solid layer on the exposed surface of the same. The thin solid film commonly exhibits a thickness of about 0.1 to 5 microns, and preferably about 1 to 2 microns. During the formation of the solid layer on the exposed surface of the film, the solvent present near the surface of the wet film is flashed off and a thin coagulated solid layer or skin of polybenzimidazole polymer remains. The remaining portion of wet film which supports the solid layer remains essentially unchanged while the solid layer is formed. The solid layer accordingly exhibits a density which is substantially greater than that of the remaining portion of the film which has not undergone coagulation and continues to possess a liquid consistency.

The evaporation of solvent from the exposed surface of the wet film may be accomplished by a variety of techniques as will be apparent to those skilled in the art. For instance, a stream of air or other gas at ambient or at an elevated temperature (e.g., approaching the boiling point of the solvent) may be simply directed at the exposed surface of the wet film. Alternatively, the wet film may be simply allowed to stand in an uncirculated gaseous environment wherein the requisite degree of solvent evaporation is accomplished. In a further embodiment of the invention, the gaseous atmosphere to which the wet film is exposed may be at reduced pressure, e.g., 100 mm. of Hg. up to near atmospheric pressure. It will be apparent to those skilled in the art that the rate at which the solvent is evaporated increases with the temperature of the gaseous atmosphere impinging upon the wet film, the flow rate of the gaseous atmosphere, and with reduced pressure. The time required to form the desired thin solid layer upon the exposed surface of the wet film commonly ranges from about 5 seconds to 30 minutes, and preferably from about 1 to 5 minutes. In a preferred embodiment of the invention the wet film is exposed to a stream of circulating air at ambient temperature (e.g. 25°C.) and pressure for about 1 to 5 minutes. When the air is not circulated, longer exposure times advantageously may be employed.

The resulting film bearing a thin solid layer upon its surface is next converted to a semipermeable membrane suitable for separating components of a solution by washing the same with a non-solvent for the polybenzimidazole polymer which is capable of removing residual quantities of the polybenzimidazole solvent. During the wash step, the remaining polybenzimidazole polymer within the wet film is coagulated while the solvent which originally dissolved the same is removed. The wash medium is preferably aqueous in nature, and is most preferably water. The wash step is preferably carried out by immersing the film in the wash medium. Alternatively, any other convenient means for contacting the film with the wash medium may be utilized, such as by spraying the film with the same. In a preferred embodiment of the invention a water wash medium is provided at a relatively cool temperature, e.g. at about 5° to 30°C., and at a temperature of about 10° to 25°C. in a particularly preferred embodiment. The time required to accomplish coagulation of the remaining polybenzimidazole polymer and the substantial removal of residual solvent for the same varies with the temperature of the wash medium. The removal of residual solvent usually requires at least about 30 seconds in contact with the wash medium. Satisfactory wash times commonly range from about 30 seconds to 20 minutes, and preferably about 2 to 5 minutes. Considerably longer wash times may be employed, but generally with no commensurate advantage.

The resulting membranes formed of polybenzimidazole polymer consist of an outer relatively thin surface layer formed during the evaporation step adjacent a relatively thick layer of a more porous structure formed during the wash step. It is believed that the denser relatively thin outer layer is primarily responsible for the ability described hereafter of the resulting membranes to effect the separation of the components of a solution, and that the remaining more porous portion of the membrane serves primarily a supporting function. The membranes are characterized by high thermal stability and can withstand temperatures during use in excess of 125°C. Also, the membranes exhibit a high degree of chemical stability, and can continue to function in spite of contact with a wide variety of solvents.

The polybenzimidazole membranes of the present invention, once positioned upon a conventional porous support such as a porous steel plate, may be utilized to separate components of a solution by a variety of techniques, such as by reverse osmosis, electrodialysis or ultrafiltration. For instance, the membranes of the present invention may be used to good advantage in those use areas where cellulose acetate separatory membranes have been used heretofore. However, because of the increased thermal and chemical stability exhibited by the polybenzimidazole membranes, a greater range of operating conditions, e.g., temperatures, may be employed. The theory whereby the membranes of the present invention function to selectively isolate components of a solution is considered complex and incapable of simple explanation. Representative separations which may be accomplished through the use of the polybenzimidazole membranes are as follows: sodium chloride from aqueous solutions of the same, inorganic or low molecular weight organic salts from aqueous solutions of the same, inorganic or low molecular weight organic acids, etc.

The polybenzimidazole membranes of the present invention are particularly suited for use in desalination operations in which the presence of sodium and chloride ions is diminished in aqueous solutions of the same by reverse osmosis. Once positioned on a conventional porous support the membrane is placed within a conventional reverse osmosis chamber with a solution of lesser salt concentration, e.g., pure water positioned on one side of the membrane and a solution of greater salt concentration on the opposite side. A pressure is exerted on the solution of greater salt concentration which exceeds the natural osmotic pressure and water of a lesser salt concentration is continuously withdrawn on the opposite low pressure side of the membrane. Additional salt water is continuously added to the high pressure side of the membrane and subjected to pressure. Pressures of about 50 to 5000 pounds per square inch and preferably about 600 to 3000 pounds per square inch may be applied to the solution of greater salt concentration to effect the reverse osmosis separation.

The free energy of the solvent (i.e., water) in an aqueous sodium chloride solution is less than the free energy of the solvent in the pure state. There results, therefore, a spontaneous tendency for the solvent to move from the relatively high free-energy state of the pure solvent to the relatively low free-energy state of the solution. This tendency can be balanced by increasing the free-energy of the solution by subjecting it to an externally applied pressure. Mathematical derivations to determine the quantitative value of the pressure differential can be found in most physical chemistry texts.

The following examples are given as specific illustrations of the invention. It should be understood, however, that the invention is not limited to the specific details set forth in the examples.

Examples I-III

A polybenzimidazole polymer solution having a viscosity of 400 poises at 30°C. was prepared employing N,N-dimethyl acetamide as solvent containing 15 per cent by weight poly-2,2'-(m-phenylene)-5,5'-bibenzimidazole based upon the total weight of the solution, and 2 per cent by weight lithium chloride based upon the total weight of the solution. The dissolution of the polymer was accomplished by agitating the same while in particulate form with the N,N-dimethyl acetamide solvent (in which the lithium chloride was previously dissolved) while in a closed zone at a temperature of about 230°C. The resulting solution was next filtered to remove any residual solids.

Quantities of the solution while at ambient temperature (i.e., 25°C.) were poured onto level smooth glass supports having upright edges extending above the surface to a uniform height of 4 mils (Examples II and III) or 8 mils (Example I) as indicated in the Table. A doctor blade was passed over the surface of the solutions at a rate of about 20 inches per minute while resting upon the upright edges of the glass supports to insure that wet films of uniform thickness were positioned upon the supports.

Next a stream of air at ambient temperature (i.e., 25°C.) was caused to impinge upon the exposed surfaces of the wet films at a velocity of about 2 feet per second. As indicated in the following Table, the wet films were exposed to the stream of air for either 5 minutes (Example II) or 15 minutes (Examples I and III). During this period N,N-dimethyl acetamide solvent was evaporated from the exposed surfaces of the films thereby forming a relatively thin dense solid layer on the surfaces thereof. The remaining portions of wet films were of substantially lesser density than the solid layers formed upon the exposed surfaces.

The resulting films while still present upon the smooth glass supports were immersed in a vessel of cool water having a temperature of about 12°C. While immersed in water, residual quantities of N,N-dimethyl acetamide were essentially completely removed from the films and the remaining polybenzimidazole polymer situated beneath the thin surface layers was coagulated to a solid porous consistency. The semipermeable membranes formed upon the removal of residual solvent had thicknesses of approximately 8 mils in Example I and of approximately 4 mils in Examples II and III.

The resulting semipermeable membranes were next utilized in the desalination of 0.5 per cent by weight aqueous sodium chloride solutions provided at 25°C. by reverse osmosis. The membranes were kept moist from the time of their formation to the time of their utilization in the reverse osmosis separation. Each membrane was stripped from the smooth glass support and positioned upon a filter paper and a porous sintered metal plate which served to support the same during desalination. Each membrane together with its porous support was positioned within a conventional reverse osmosis apparatus of the flat plate type with the sodium chloride solution on one side of the membrane and pure water on the opposite side of the membrane. The more dense surface of the polybenzimidazole membrane is exposed and faces the aqueous sodium chloride solution. A pressure of 1,000 pounds per square inch was applied to the sodium chloride solution.

The rejection value is a relative measure of the ability of the membrane to retard passage of the component being separated from the solution usually expressed as a weight percentage of the total.

Flux refers to the amount of solvent passing through the membrane per unit area per unit time and is generally expressed as gallons/ft.²/day.

As indicated in the Table, flux rates of 1.8 to 14.5 gallons per square foot per day and rejection rates of 53 to 95 per cent were observed for the Examples.

TABLE

| Ex. No. | Wet Film Thickness | Solvent Evaporation Time | Flux | Per Cent Rejection |
| --- | --- | --- | --- | --- |
| I | 8 mils | 15 min. | 1.8 | 93 |
| II | 4 mils | 5 min. | 14.5 | 53 |
| III | 4 mils | 15 min. | 1.9 | 95 |

Commonly assigned U.S. Ser. No. 30,846 of Abraham A. Boom, filed concurrently herewith, discloses a process wherein improved semipermeable polybenzimidazole membranes may be produced.

Although the invention has been described with preferred embodiments, it is to be understood that variations and modifications may be resorted to as will be apparent to those skilled in the art. Such variations and modifications are to be considered within the purview and scope of the claims appended hereto.

I claim:

1. A process for the desalination of water comprising:
   a. providing a solution of a polybenzimidazole polymer consisting essentially of recurring units of the formula:

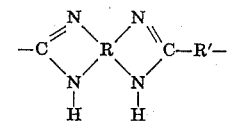

wherein R is a tetravalent aromatic nucleus, with the nitrogen atoms forming the benzimidazole rings paired upon adjacent carbon atoms of said aromatic nucleus, and R' is selected from the group consisting of (1) an aromatic ring, (2) an alkylene group having from four to eight carbon atoms, and (3) a heterocyclic ring selected from the group consisting of (a) pyridine, (b) pyrazine, (c) furan, (d) quinoline, (e) thiophene, and (f) pyran in a solvent capable of dissolving said polymer,
   b. depositing a film of said solution upon a support,
   c. evaporating an amount of solvent from said film sufficient to allow the formation of a thin solid layer on the exposed surface of said film having a density which is substantially greater than that of the remaining portion of said film on which said solid layer of increased density is formed,
   d. washing the resulting film with a non-solvent for said polymer to remove residual solvent thereby producing a reverse osmosis semipermeable membrane, of unusually high physical durability and chemical stability,
   e. positioning said semipermeable membrane while adjacent a porous support within an aqueous sodium chloride solution wherein the concentration of dissolved sodium chloride in said solution is greater on one side of said membrane than upon the other side of said membrane,
   f. applying a pressure of about 600 to 3000 pounds per square inch to that portion of said sodium chloride solution having a greater concentration of sodium chloride dissolved therein thereby causing water to pass through said semipermeable membrane via reverse osmosis to the substantial exclusion of dissolved sodium chloride, and g. recovering said solution from said side of said membrane having a lesser concentration of sodium chloride dissolved therein.

2. An improved reverse osmosis semipermeable membrane of unusually high physical durability and chemical stability suitable for use in a reverse osmosis separation consisting essentially of poly-2,2'-(m-phenylene)-5,5'-bibenzimidazole formed in accordance with the process of claim 1.

3. A process according to claim 1 wherein said polybenzimidazole polymer is poly-2,2'-(m-phenylene)-5,5'-bibenzimidazole.

4. A process according to claim 1 wherein said solvent capable of dissolving said polymer is selected from the group consisting of N,N-dimethyl acetamide, N,N-dimethyl formamide, dimethyl sulfoxide and N-methyl-2-pyrrolidone.

5. A process according to claim 1 wherein said solvent is N,N-dimethyl acetamide.

6. A process according to claim 1 wherein said polybenzimidazole polymer is present in said solvent in a concentration of about 5 to 30 per cent by weight based upon the total weight of the solution.

7. A process according to claim 1 wherein said film is deposited on said support in a thickness of about 1 to 30 mils.

8. A process according to claim 1 wherein said thin solid layer formed upon the surface of said film by the evaporation of said solvent has a thickness of about 0.1 to 5 microns.

9. A process according to claim 1 wherein said resulting film is washed in water to remove residual solvent and thereby produce a semipermeable membrane.

10. A process according to claim 1 wherein said water is present at a temperature of about 5° to 30°C.

* * * * *